United States Patent
Chang (10) Patent No.: US 10,213,906 B2
(45) Date of Patent: Feb. 26, 2019

(54) SNAP HOOK

(71) Applicant: Teng-Yao Chang, Taichung (TW)

(72) Inventor: Teng-Yao Chang, Taichung (TW)

( * ) Notice: Subject to any disclaimer, the term of this patent is extended or adjusted under 35 U.S.C. 154(b) by 241 days.

(21) Appl. No.: 15/436,014

(22) Filed: Feb. 17, 2017

(65) Prior Publication Data

US 2018/0235321 A1 Aug. 23, 2018

(51) Int. Cl.
*B25F 1/04* (2006.01)
*B25B 13/04* (2006.01)
*B25B 15/00* (2006.01)
*F16B 45/02* (2006.01)

(52) U.S. Cl.
CPC ............ *B25B 13/04* (2013.01); *B25B 15/007* (2013.01); *B25F 1/04* (2013.01); *F16B 45/02* (2013.01)

(58) Field of Classification Search
CPC ....... B25B 15/007; B25B 13/04; A44B 13/02; A44B 11/005; A44B 11/28; F16B 45/02; B25F 1/04
See application file for complete search history.

(56) References Cited

U.S. PATENT DOCUMENTS

| 8,966,690 B2 * | 3/2015 | Stokes | H02G 1/005 |
| | | | 30/153 |
| 2018/0001464 A1 * | 1/2018 | Frederick | B25B 15/004 |

* cited by examiner

*Primary Examiner* — David B. Thomas
(74) *Attorney, Agent, or Firm* — Lynette Wylie; Apex Juris, pllc (57) ABSTRACT

A snap hook includes a frame, a gate, and a screwdriver blade. The frame has a first hook portion and a second hook portion located on different sides. The gate has an abutting end abutting against an end of the first hook portion. The screwdriver blade is pivotally connected to the frame, and a working end is formed on an end of the screwdriver blade whereby the snap hook could be engaged with two objects through the first hook portion and the second hook portion. The gate blocks a side opening of the first hook portion, and therefore the object hanged in the first hook portion would not fall out accidentally. Furthermore, the screwdriver blade increases the added value of the snap hook.

7 Claims, 7 Drawing Sheets

SNAP HOOK

BACKGROUND OF THE INVENTION

1. Technical Field

The present invention relates to a tool for hanging objects, and more particularly to a versatile snap hook.

2. Description of Related Art

Snap hooks are commonly seen auxiliary tools. Many people would engage a belt with a snap hook to carry small objects, whereby the objects would not fall out by accident. A snap hook could also be used to connect two straps into a longer strap or a strap with different patterns to meet specific requirements. In addition, it's common to engage a snap hook with the strap of a bag or a backpack to hang objects such as hanging ornaments, umbrellas, keys, etc., which makes the hanged objects more easy to be taken. Snap hooks are indispensable tools especially for mountaineers or cyclists, for a mountaineer has to carry a lot of mountaineering equipment, and a cyclist usually uses a snap hook to hang the baggage on the rack of a bicycle.

However, a conventional snap hook has merely one single function, and therefore its usage is limited in practice. With fewer items to carry, less burden a mountaineer or a cyclist has to bear. If a snap hook merely provides one single function, the user would have to carry more tools at once. For the above reasons, conventional snap hooks still have room for improvements.

BRIEF SUMMARY OF THE INVENTION

In view of the above, the primary objective of the present invention is to provide a snap hook, which could be engaged with different types of straps. The snap hook has at least one screwdriver blade, which could make the snap hook versatile and convenient.

To achieve the objective of the present invention, the present invention provides a snap hook, which includes a frame, a gate, and a screwdriver blade. The frame has a first hook portion and a second hook portion located on opposite sides. The gate has an abutting end abutting against an end of the first hook portion. The screwdriver blade is pivotally connected to the frame, wherein a working end is formed on an end of the screwdriver blade.

With the aforementioned design, the screwdriver blade could provide an added value for the snap hook, and the user would not need to carry an additional screwdriver, which would be convenient for mountaineering, cycling, or other activities.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As illustrated in FIG. 1 to FIG. 3a and FIG. 3b, a snap hook 100 of an embodiment of the present invention includes a frame 10, a gate 20, and a screwdriver blade 30.

The frame 10 has an obverse 11, a reverse 12 opposite to the obverse 11, a first hook portion 13, a second hook portion 14, a blocking portion 15, a notch 10a, an engaging bore 10b, and two blocking holes 10c, wherein the engaging bore 10b and the blocking holes 10c all go through the obverse 11 and the reverse 12 of the frame 10. The first hook portion 13 and the second hook portion 14 are located on opposite sides of the frame 10, respectively, wherein an end of the first hook portion 13 extends in a direction toward the blocking holes 10c, and a recess 13a is provided on an end of an inner edge thereof. The first hook portion 13 has a side opening 13b communicating with the outside. It is noted that a center of each of the blocking holes 10c and a center of the recess 13a are not arranged on a straight line. The blocking portion 15 is provided on a peripheral edge of the notch 10a. The peripheral edge of the notch 10a further has two pivot holes (not shown) facing each other.

The gate 20 is formed by bending a metal stick, and has an open end 20a and a closed end 20b which corresponds to the open end 20a. The open end 20a has two rods 21, wherein one of the rods 21 passes through one of the blocking holes 10c from the obverse 11 of the frame 10, while the other one of the rods 21 passes through the other one of the blocking holes 10c from the reverse 12 of the frame 10. The closed end 20b abuts against the recess 13a of the first hook 13. In the embodiment, the closed end 20b forms an abutting end of the gate 20, and a portion of the abutting end abuts against the recess 13a is defined as a protrusion.

Two ends of the screwdriver blade 30 are respectively a pivot end 30a and a working end 30b, wherein the pivot end 30a has a perforation (not shown) going therethrough. The screwdriver blade 30 could be provided in the notch 10a, with the perforation of the pivot end 30a facing the pivot holes. A pin 31 passes through the pivot holes and the perforation of the pivot end 30a, whereby the screwdriver blade 30 is pivotally provided on the frame 10. The screwdriver blade 30 further has a blocked portion 32, wherein the blocked portion 32 matches the blocking portion 15 of the frame 10 so as to stably hold the screwdriver blade 30 in the notch 10a.

The components of the snap hook of the present invention and the way of assembling the components are explained in the aforementioned paragraphs, and the way of using the snap hook will be described in details below. The snap hook 100 could be engaged with an object such as a backpack or a handbag by letting the second hook portion 14 pass through a strap of the object which is sewn into a ring. The first hook portion 13 of the snap hook 100 is adapted to be hooked by another object such as a water bottle or an umbrella. In this way, said two objects could be engaged together through the snap hook 100, and therefore it would be convenient to carry them around. Of course, said two objects could be articles other than what exemplified above. In an embodiment, the snap hook could further include a third hook portion facing the second hook portion, wherein the third hook portion and the second hook portion are adapted to pass through the same ring of strap, which would increase the load capacity of the snap hook.

The engaging bore 10b of the frame 10 could be engaged with another snap hook, a hook, a charm, etc. In addition, if the shape of the engaging bore 10b is hexagonal, it could be used to engage a bolt with hexagonal head or a hexagon nut. In such cases, the frame itself is deemed an auxiliary tool, which could help the user to easily fasten or loosen the bolt or the nut.

In the current embodiment, since the center of each of the blocking holes 10c and the center of the recess 13a are not arranged on a straight line (i.e., three points are not collinear), the gate 20 could pass through different blocking holes 10c with the rods 21, while another end of the gate 20 abuts against the recess 13a. Therefore, the gate 20 is twisted in a normal condition, and exerts a torque to urge the closed end 20b of the gate 20 to tightly abut against the recess 13a of the first hook portion 13. In this way, the gate 20 would not swing no matter the snap hook 100 is upright, upside down, tilting, or in any other position. Said normal condition refers to a condition when the closed end 20b of the gate 20 naturally abuts against the recess 13a with no external forces exerted thereto.

Figure 1:
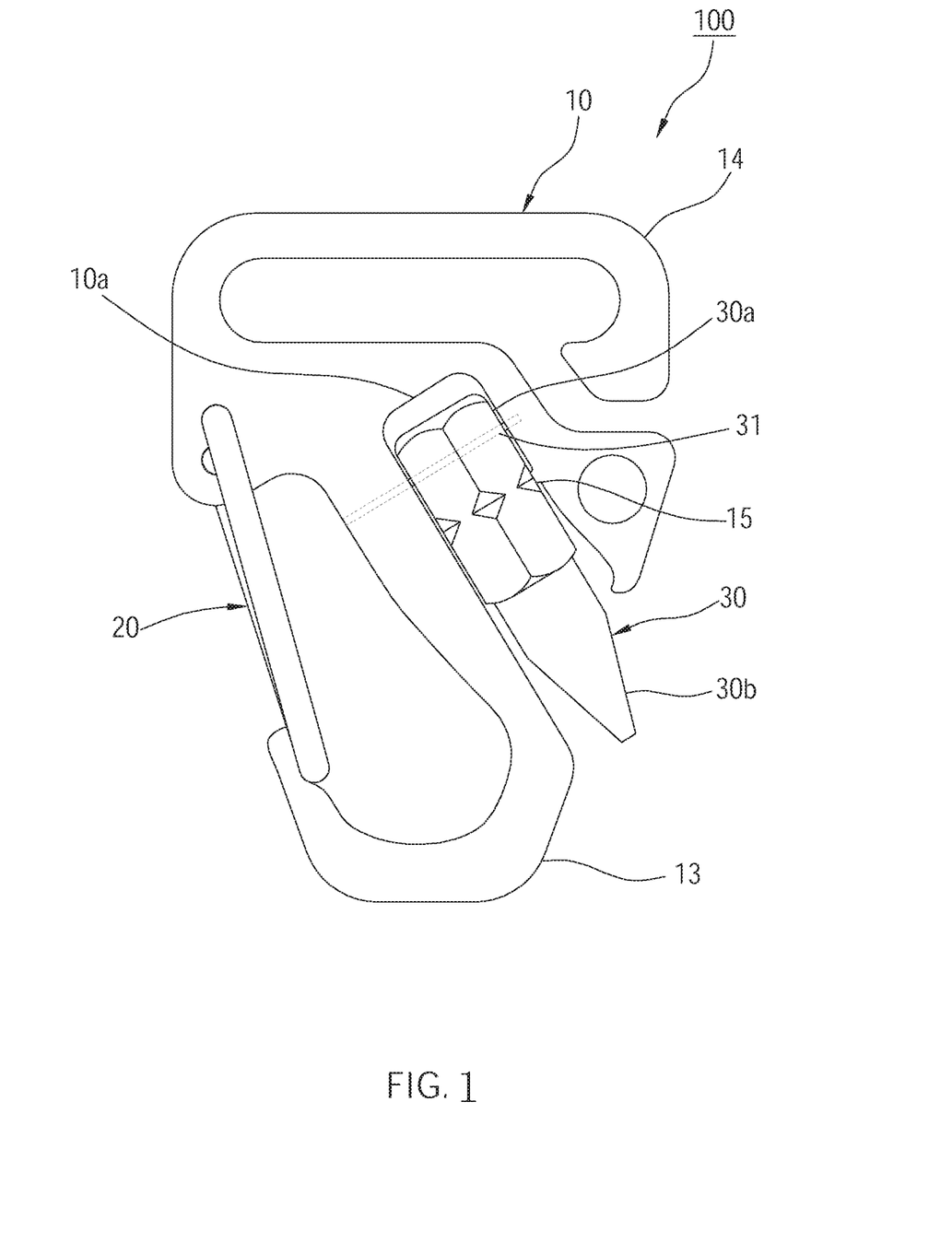
FIG. 1 is a front view of the snap hook of an embodiment of the present invention.
Figure 2:
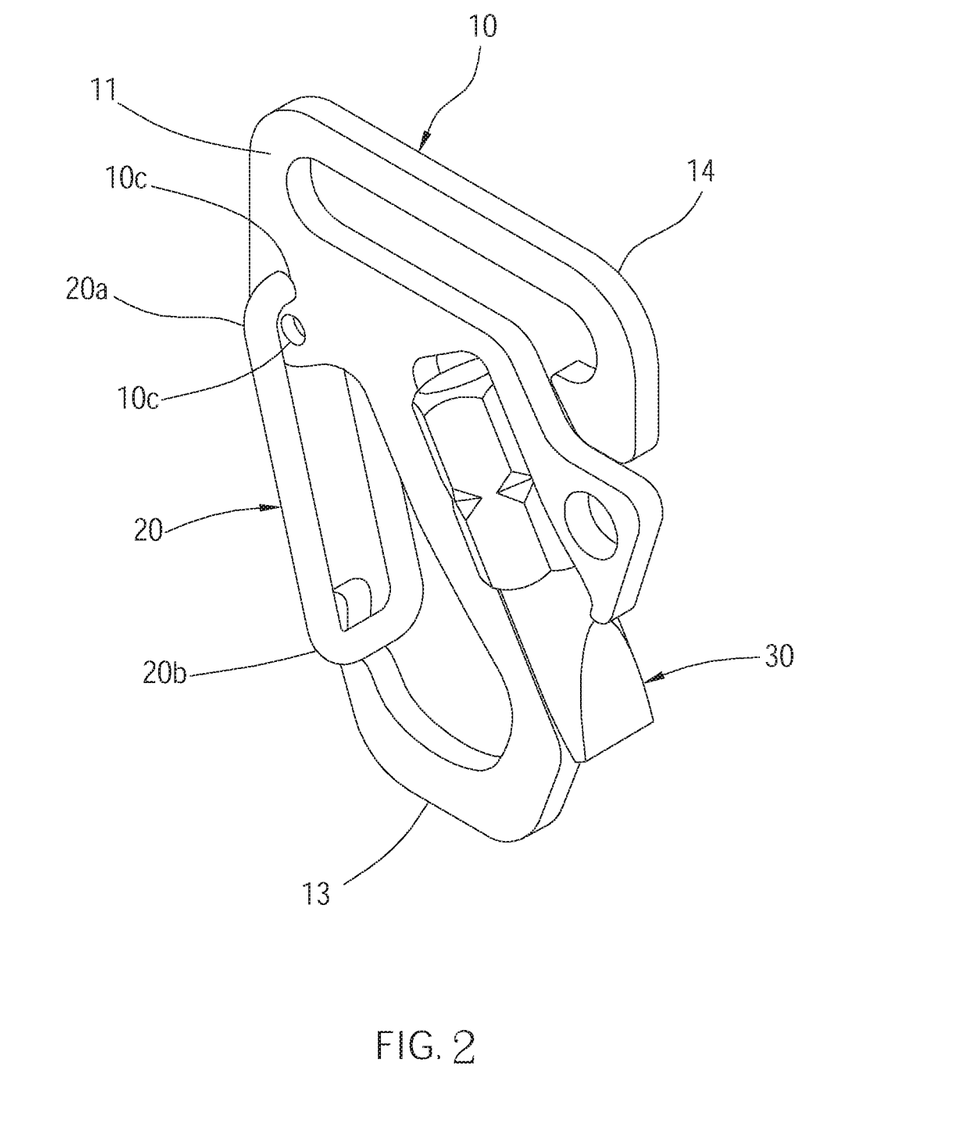
FIG. 2 is a perspective view of the embodiment.
Figure 3A:
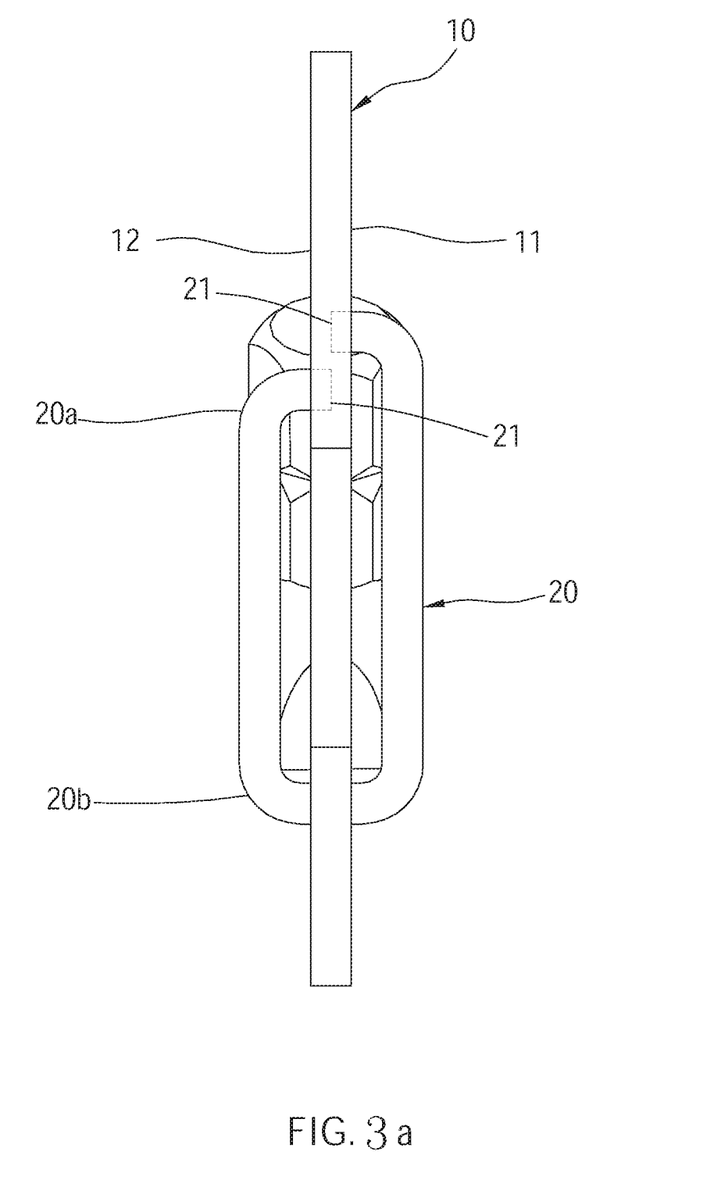
FIG. 3a is a left side view of the embodiment.
Figure 3B:
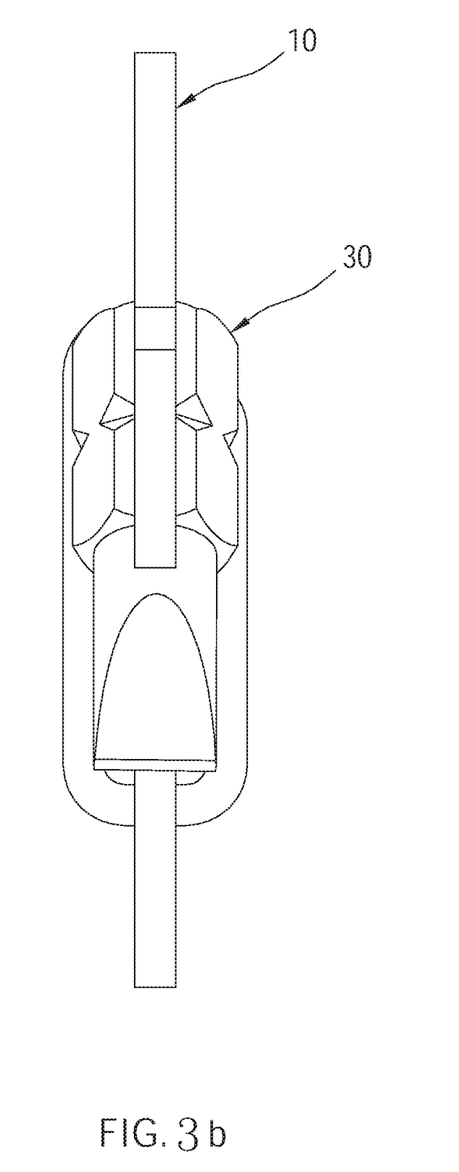
FIG. 3b is a right side view of the embodiment.
Figure 4:
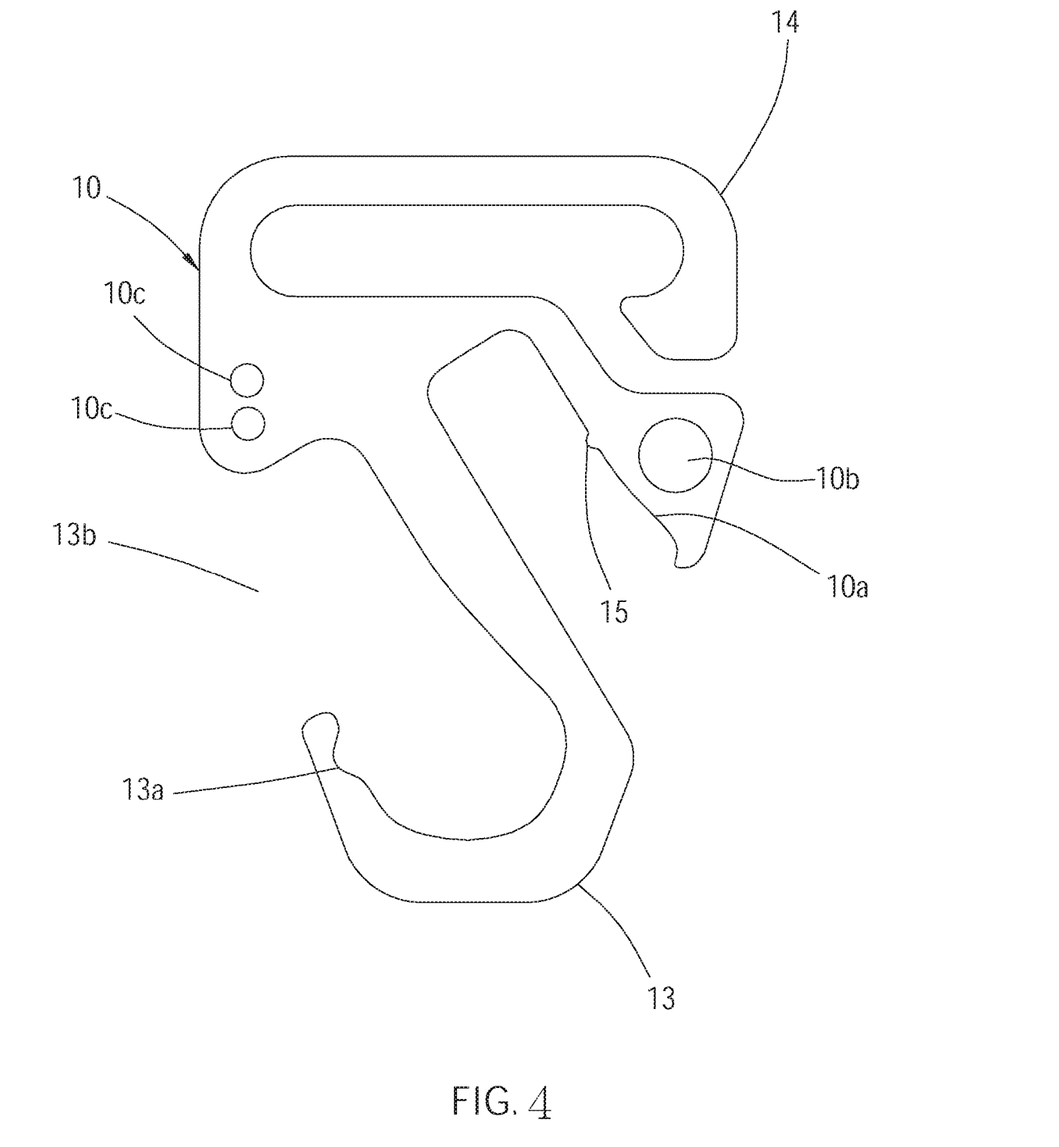
FIG. 4 is a front view of part of the components of the snap hook of the embodiment.
Figure 5:
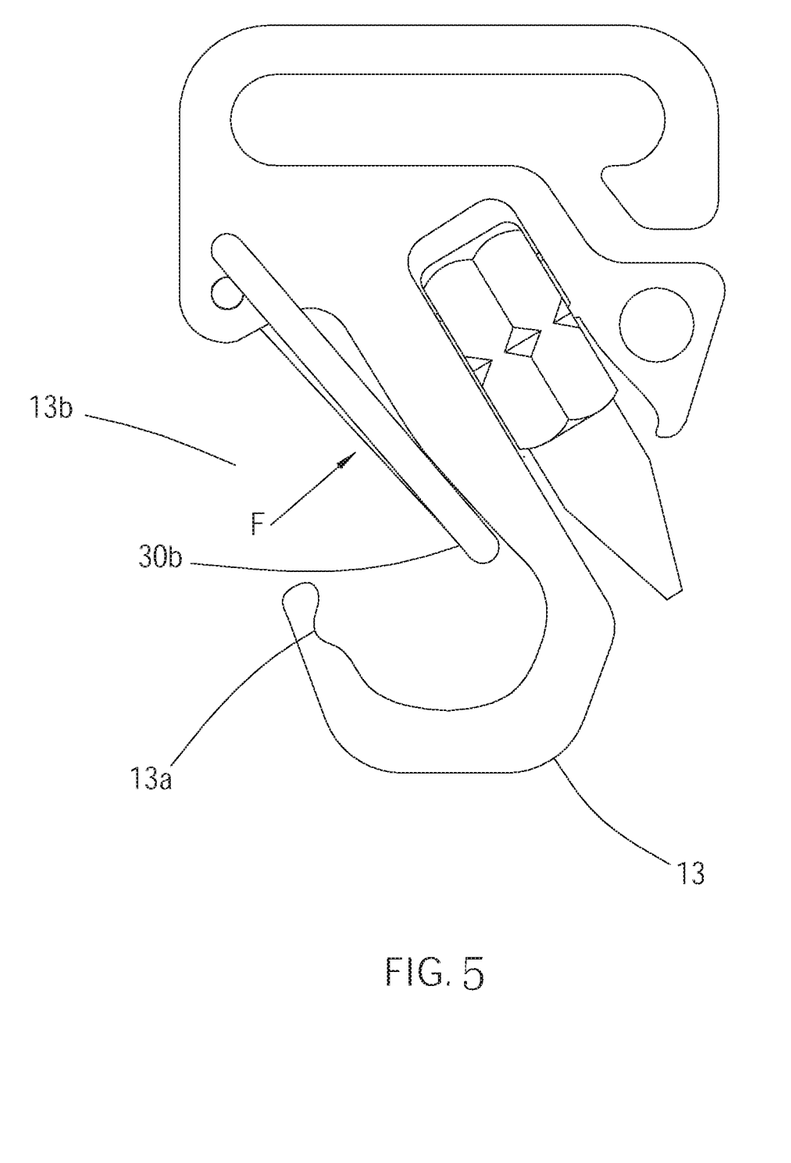
FIG. 5 is a schematic diagram, showing the snap hook of the embodiment in use.

As shown in FIG. 1 and FIG. 5, when the gate 20 is under an external force F which is greater than the torque, the gate 20 would be elastically deformed and moved from a position which blocks the side opening 13b to a position which not block the side opening 13b. In other words, when the closed end 20b of the gate 20 is apart from the recess 13a of the first hook portion 13, the side opening 13b of the first hook portion 13 would communicate an inner side of the first hook portion 13 and the outside, whereby an object could enter the inner side of the first hook portion 13. When the external force is dismissed, the gate 20 would naturally return to the original condition by the torque to block the side opening 13b, whereby the object would not accidentally fall out of the first hook portion 13.

In the current embodiment, the gate 20 is a non-closed ring made by metal. However, this is not a limitation of the present invention. The gate could have different structures, as long as an end of the gate abuts against the first hook portion, and another end thereof has a plurality of rods passing through the corresponding blocking holes 10c on the different side of the frame. In other words, part of the rods pass through the blocking holes 10c from the obverse, while another part of the rods pass through the blocking holes 10c from the reverse, and the blocking holes passed through by the rods from the obverse are different from the blocking holes passed through by other rods from the reverse. In this way, the gate could be twisted in the normal condition. In the current embodiment, since the gate 20 abuts against the inner edge of the first hook portion 13, the objects hooked therein would not accidentally fall out of the first hook portion 13. However, said structure is not a limitation of the present invention. The gate could also abut against an outer side of the first hook portion 13.

Figure 6:
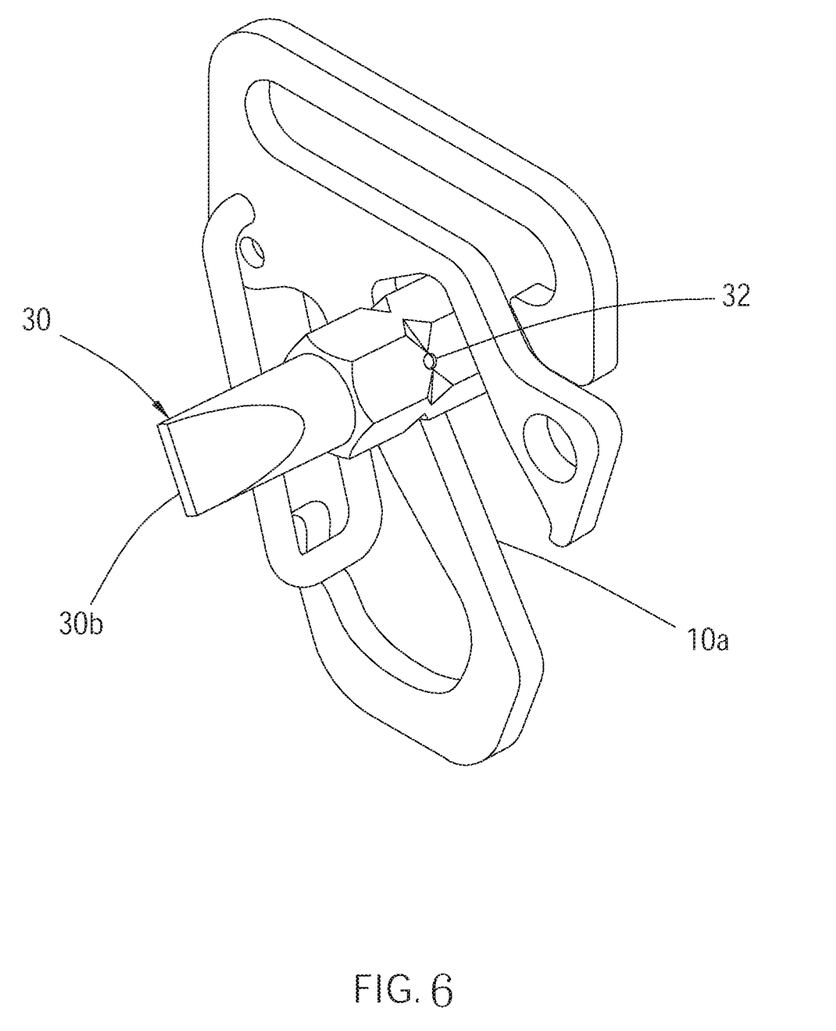
FIG. 6 is a schematic diagram, showing the snap hook of the embodiment in use.

As shown in FIG. 1 and FIG. 6, the screwdriver blade 30 could pivot around the pin 31, and therefore the working end 30b of the screwdriver blade 30 could be moved between a position received in the notch 10a and a position away from the notch 10a. When the working end 30b of the screwdriver blade 30 is away from the notch 10a, the screwdriver blade 30 could be used. For instance, the screwdriver blade 30 could be used as a flathead screwdriver if the working end 30b thereof is flat-headed. The screwdriver blade 30 could be pivoted to retreat into the notch 10a. More specifically, once the blocked portion 32 of the screwdriver blade 30 is moved to align with the blocking portion 15 of the frame 10 again, the screwdriver blade 30 would be fixed and received in the notch 10a then. In the embodiment, the screwdriver blade 30 is fixed on the frame 10 with a pin 31 as a pivotal axis. However, such arrangement is not a limitation of the present invention. The frame and the screwdriver blade could be assembled by using two pairs of corresponding protrusions and recesses, wherein the protrusions could be provided on either the frame or the screwdriver blade to fit into the recesses provided on the other component.

Since the screwdriver blade 30 is received in the notch 10a, the screwdriver blade 30 would not occupy additional space. However, the screwdriver blade 30 is not limited to be received in the notch 10a. In the current embodiment, the screwdriver blade 30 is flat-headed, but this is not a limitation of the present invention. The screwdriver blade 30 could be other types. Also, the number of the screwdriver blade 30 is not a limitation of the present invention. To the premise of not affecting the convenience of using the snap hook 100, there could be more notches provided at proper positions on the frame to receive more screwdriver blades. In this way, different types of screwdriver blades could be provided in the notches, which would further enhance the added value of the snap hook. Alternatively, there could be even multiple screwdriver blades received in one notch. No matter it is multiple screwdriver blades received in multiple notches or just one notch, the user would have more types of screwdriver blades for selection.

In other embodiment, the perforation of the screwdriver blade could be provided in a middle section of the screwdriver blade (i.e., the pin would pass through the middle section of the screwdriver blade), and two ends of the screwdriver blade could be both working ends with different functions, which would further improve the versatility of the snap hook.

It must be pointed out that the embodiments described above are only some preferred embodiments of the present invention. All equivalent structures which employ the concepts disclosed in this specification and the appended claims should fall within the scope of the present invention.

What is claimed is:

1. A snap hook, comprising:
   a frame having a first hook portion and a second hook portion located on opposite sides;
   a gate having an abutting end abutting against an end of the first hook portion; and
   a screwdriver blade pivotally connected to the frame, wherein a working end is formed on an end of the screwdriver blade.

2. The snap hook of claim 1, wherein at least one blocking portion is provided on the frame, and at least one blocked portion is provided on the screwdriver blade; the at least one blocking portion matches the at least one blocked portion.

3. The snap hook of claim 1, wherein the abutting end of the gate abuts against an inner edge of the first hook.

4. The snap hook of claim 3, wherein the abutting end of the gate comprises a protrusion, and the first hook portion has a recess matches the protrusion.

5. The snap hook of claim 1, wherein an engaging bore is provided passing through the frame, and is adapted to engage an object with the snap hook.

6. The snap hook of claim 5, wherein the engaging bore is adapted to engage a bolt or a nut.

7. The snap hook of claim 1, wherein two blocking holes are provided passing through the frame; the gate has two rods, and each of the rods is provided passing through one of the blocking holes from two different sides of the frame, respectively; the abutting end forms an end which is away from the rods.

* * * * *